US010027704B2

(12) United States Patent
Kong

(10) Patent No.: US 10,027,704 B2
(45) Date of Patent: Jul. 17, 2018

(54) MALICIOUS PROGRAM FINDING AND KILLING DEVICE, METHOD AND SERVER BASED ON CLOUD SECURITY

(71) Applicant: Beijing Qihoo Technology Company Limited, Beijing (CN)

(72) Inventor: Qinglong Kong, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 188 days.

(21) Appl. No.: 14/905,938

(22) PCT Filed: Jul. 17, 2014

(86) PCT No.: PCT/CN2014/082400
§ 371 (c)(1),
(2) Date: Jan. 18, 2016

(87) PCT Pub. No.: WO2015/007224
PCT Pub. Date: Jan. 22, 2015

(65) Prior Publication Data
US 2016/0164887 A1    Jun. 9, 2016

(30) Foreign Application Priority Data

Jul. 18, 2013    (CN) .......................... 2013 1 0303814

(51) Int. Cl.
*H04L 29/06* (2006.01)
*G06F 21/56* (2013.01)

(52) U.S. Cl.
CPC .......... *H04L 63/145* (2013.01); *G06F 21/562* (2013.01); *G06F 21/567* (2013.01);
(Continued)

(58) Field of Classification Search
CPC ..................................................... H04L 63/145
See application file for complete search history.

(56) References Cited

U.S. PATENT DOCUMENTS

| 9,292,689 B1 * | 3/2016 | Chuo ................... H04L 63/145 |
| 2008/0163372 A1 * | 7/2008 | Wang ...................... G06F 21/56 726/24 |

(Continued)

FOREIGN PATENT DOCUMENTS

| CN | 102799811 | 11/2012 |
| CN | 102915421 | 2/2013 |

(Continued)

*Primary Examiner* — Shawnchoy Rahman
(74) *Attorney, Agent, or Firm* — Harness, Dickey & Pierce, P.L.C.

(57) ABSTRACT

Disclosed are a malicious program finding and killing device, method and server. The device comprises: one or more non-transitory computer readable medium configured to store computer-executable instructions; at least one processor to execute the computer-executable instructions to perform operations comprising: sending information to a server, and receiving information returned by the server; starting a scan task to scan an object to be scanned, calculating an index tag of a file scanned, send the index tag to the server, and receiving a script returned by the server, the script being found according to the index tag and corresponding to the file scanned; and executing the received script to find and kill the malicious program in the file scanned.

15 Claims, 4 Drawing Sheets

(52) U.S. Cl.
CPC ........ *H04L 63/0263* (2013.01); *H04L 63/205* (2013.01); *H04L 63/1416* (2013.01); *H04L 63/1425* (2013.01)

(56) References Cited

U.S. PATENT DOCUMENTS

2011/0016529 A1\*   1/2011   Kakie ................... G06F 21/566
                                                           726/24
2012/0002839 A1\*   1/2012   Niemela ............ G06K 9/00973
                                                           382/100
2014/0157408 A1\*   6/2014   Mei ........................ G06F 21/55
                                                           726/22

FOREIGN PATENT DOCUMENTS

| | | |
|---|---|---|
| CN | 102982284 | 3/2013 |
| CN | 103152356 | 6/2013 |
| CN | 103390130 | 11/2013 |
| KR | 101398852 B1 \* | 6/2014 |

\* cited by examiner

MALICIOUS PROGRAM FINDING AND KILLING DEVICE, METHOD AND SERVER BASED ON CLOUD SECURITY

TECHNICAL FIELD

The invention relates to the field of computer safety, particularly to a malicious program finding and killing device, method and server based on cloud security.

DESCRIPTION OF RELATED ART

With popularity of computer, almost all clients need to install an antivirus program to scan files in a computer. When the antivirus program is scanning, massive CPU operations and disk operations are needed, thus the scanning process is time consuming and affects speed of the system. For the files in the computer, many of them are the same, such as Windows files, installation package files of various kinds of software, help files, and compressed files, etc.

Traditional technical scheme of finding and killing malicious programs is a finding and killing mode based on signatures. This finding and killing mode mainly depends on signatures database pattern. The signatures database consists of signatures of samples of malicious programs collected by a manufacturer, and the signatures are different features of a malicious program from a security program obtained by analyzing the malicious program by an analysis engineer. For example, the signatures can be a segment of intercepted program codes similar to a "search keyword". During judging a malicious program, a file is read and the file is matched with the signatures in the signatures database, and if the program codes of the file are matched, the program of the file is judged as a malicious program.

However, nowadays the quantity of malicious programs in the world increases geometrically. Based on this explosive increasing speed, the increase of signatures database always lags behind the increase of malicious programs in the network.

In prior arts, when a new malicious program appears, a sample of the new malicious program needs to be analyzed, and the version of finding and killing engine of each terminal should be updated according to the analysis result. Since the updating process is time consuming, the malicious program is easy to spread by taking advantage of the long updating time.

In addition, in prior arts, when a file is judged as a malicious program, operations of finding and killing the malicious program, such as deleting, are performed by the local finding and killing engine of a terminal. The finding and killing operations are usually universal operations and not directed at the processed file, thus erroneous finding and killing operations will cause a system or applications in the terminal unable to work properly after the finding and killing.

BRIEF SUMMARY OF THE INVENTION

In view of aforesaid problem, the present invention is put forward to provide a malicious program finding and killing method, device and server to overcome aforesaid problem or at least partly solve aforesaid problem.

According to one aspect of the present invention, a malicious program finding and killing method based on cloud security is provided, and the method comprises:
 starting a scan task to scan an object to be scanned;
 calculating an index tag of a file scanned, sending the index tag to a server, and receiving a script returned by the server, the script being found according to the index tag and corresponding to the file scanned; and
 executing the received script to find and kill malicious program in the file scanned.

According to another aspect of the present invention, a malicious program finding and killing device based on cloud security is provided, and the device comprises:
 a communication unit configured to send information to a server, and receive information returned by the server;
 a scanning unit configured to start a scan task to scan an object to be scanned, calculate an index tag of a file scanned, send the index tag to the server via the communication unit, and receive a script returned by the server, the script being found according to the index tag and corresponding to the file scanned; and
 a finding and killing unit configured to execute the received script to find and kill malicious program in the file scanned.

According to further aspect of the present invention, a malicious program finding and killing server based on cloud security is provided, and the server comprises:
 a storage unit configured to store scripts for finding and killing malicious programs in files;
 a communication unit configured to receiving an index tag;
 a searching unit configured to searching a corresponding script in the storage unit according to the received index tag;
 the communication unit further configured to return the script that is found.

According to still further aspect of the present invention, a computer program is provided, comprising computer readable codes. When the computer readable codes are running on a terminal device, the terminal device is caused to execute the malicious program finding and killing method based on cloud security according to any one of methods mentioned above.

According to more still further aspect of the present invention, a computer readable medium is provided, wherein storing aforesaid computer program.

According to the technical scheme of the invention, start a scan task to scan an object to be scanned, calculate an index tag of a file scanned, send the index tag to a server, and receive the script returned by the server, the script being found according to the index tag and corresponding to the file scanned, and execute the received script to find and kill the malicious program in the file scanned. Thus the script can be obtained from the server, and the script can be executed to find and kill the malicious programs timely, without need to wait for the finding and killing engine of the terminal to update the version to find and kill the newly emerging malicious program; furthermore, the script is found according to the index tag of the file, and the script is corresponding to the file and is directed at the file, which avoids a system or applications in a terminal unable to work properly after the finding and killing due to an erroneous operation for finding and killing the malicious programs.

Therefore, adopting the technical scheme of the invention solves the problem of malicious program proliferation caused by the time-consuming version updating process of a finding and killing engine of a terminal, and solves the problem of a system or applications in a terminal unable to work properly after the finding and killing due to an erroneous operation for finding and killing malicious programs.

In addition, the beneficial effects of timely finding and killing the malicious programs to reduce the scope of malicious program proliferation and avoiding an erroneous operation for finding and killing the malicious programs and thus ensuring a system or applications in a terminal work properly after the finding and killing are achieved.

Above description is only a summary of the technical scheme of the present invention. In order to understand the technical means of the present invention more clearly so that it can be put into effect according to the content of the description, and to make aforesaid and other purpose, features and advantages of the invention clearer, the embodiments of the invention will be described in further detail with reference to the drawings and embodiments.

BRIEF DESCRIPTION OF THE DRAWINGS

By reading the detailed description of the preferably selected embodiments below, various other advantages and benefits become clear for a person of ordinary skill in the art. The drawings are only used for showing the purpose of the preferred embodiments and are not intended to limit the present invention. And in the whole drawings, same drawing reference signs are used for representing same components. In the drawings.

DETAILED DESCRIPTION OF THE INVENTION

The embodiments of the present disclosure are described in further detail with reference to the drawings below. Although the drawings show the embodiments of the present disclosure, it should be understood that the disclosure can be implemented in various forms and is not intended to be limited by the embodiments described here. On the contrary, the embodiments are provided to make the invention understood more thoroughly and to completely convey the scope of the disclosure to a person skilled in the art.

Figure 1:
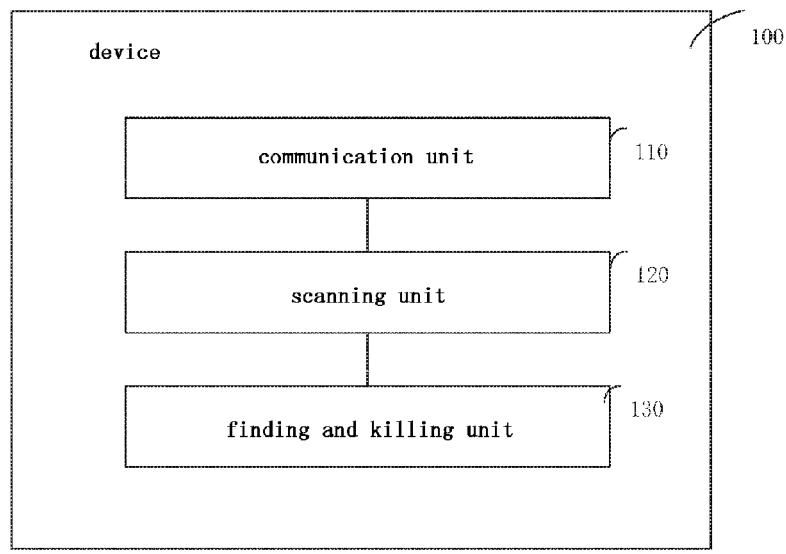
FIG. 1 is a structure diagram of a malicious program finding and killing device based on cloud security according to an embodiment of the invention.

FIG. 1 is a structure diagram of a malicious program finding and killing device based on cloud security according to an embodiment of the invention. The device 100 comprises: a communication unit 110, a scanning unit 120, and a finding and killing unit 130.

The communication unit 100 is configured to send information to a server 200, and receive information returned by the server 200.

The scanning unit 120 is configured to start a scan task to scan an object to be scanned, calculate an index tag of a file scanned, send the index tag to the server 200 via the communication unit 110, and receive a script returned by the server 200, the script being found according to the index tag and corresponding to the file scanned.

For example, the starting a scan task can be triggered by means of timing or user operation, etc. That is, the scanning unit 120 is timed to start the scan task, or starts the scan task when receiving an operation instruction of a user. The scanned object can be a memory, a boot sector, BIOS (basic input/output system), etc.

For scanning the memory, process space and process modules are enumerated to match the signatures of memory, and calculate certain memory segments and digests of memory modules; for scanning the boot sector, an API provided by a file system can be used for reading specific blocks and boot codes, matching the signatures and calculating digests of the specific blocks; for scanning BIOS, a relevant API provided by the system can be employed to read specific blocks and code segments, match the signatures and calculate digests of the specific blocks. The local engine can judges infected files through information obtained from the scanning.

The invention also can judge whether a file scanned is infected or not via a server, and the specifics are as follows:

For example, the scanning unit 120 is specifically configured to calculate encryption value of full text and/or signature of the file scanned, and take the encryption value as an index tag. For example, the scanning unit 120 calculates MD5 (message digest algorithm version 5) of full text and/or signature of the file or SHA1 (hash value) of full text and/or signature of the file while scanning the object to be scanned. The MD5 or SHA1 is the index tag. Specifically, the scanning unit 120 can determine calculating MD5 or SHA1 of full text or signature, or calculating MD5 or SHA1 of both full text and signature by configurations. The configurations can be configurations in a configuration file issued by the server 200, comprising different configurations for conditions of file type, registry position and the like.

Wherein when the encryption value of the full text is calculated, the index tag comprises signatures and digest information. Therefore, the server can detect whether the file is infected or not according to the information in the index tag, and return a script of finding and killing malicious programs in the infected file. Therefore, when the script corresponding to the file is received, the file is determined to be an infected file.

The communication unit 110 sends the calculated MD5 or SHA1 of the file scanned to the server 200. After receiving MD5 or SHA1, the server 200 searches for the received MD5 or SHA1 in a rule list, and after founding it, issues the designated script in the list to the device 100. The operations executed by the script are finding and killing the malicious programs corresponding to MD5 or SHA1.

Specifically, script types achieved in format of scripting language or XML (extensive markup language), JSON and so on can be used.

For example, the finding and killing operation in the script comprises judging whether or not the file scanned is an infected system file or an application file, and if yes, repairing the file scanned, and if not, deleting the file scanned. The specific repairing operations comprise: eliminating interceptions of function call (also referred to as removing system hooks), recovering hard disk master boot record (mbr), or clearing shellcode. The operation of deleting the file scanned comprises deleting the entire file or deleting the part with a problem in the file, such as deleting the hook in the file.

The finding and killing unit 130 is configured to execute the received script to find and kill the malicious programs in the files scanned.

Specifically, after receiving the script, the finding and killing unit 130 determines that the file scanned is an infected file; executing the received script, judging whether the file scanned is a system file or an application file according to the path of the file scanned, and if yes, repairing the file scanned, and if not, deleting the file scanned. The finding and killing unit 130 determines the type of a virus infecting the file scanned, and determines a way of repairing the file scanned according to the type of the virus infecting the file scanned. The way comprises: repairing the system file, repairing the application file, eliminating interceptions of function call, recovering hard disk master boot record, or clearing shellcode.

Wherein after calculating the encryption value of the file scanned, the scanning unit 120 can continue to scan subsequent files, without need to wait for the finding and killing unit 130 to receive the script and finish finding and killing to scan the subsequent files. Thus, resources can be used effectively, reducing waiting and speeding up scanning.

According to the embodiment of the invention, the script can be obtained from the server, and the script can be executed to find and kill the malicious programs timely, without need to wait for the finding and killing engine of the terminal to update the version to find and kill the newly emerging malicious program; furthermore, the script is found according to the index tag of the file, and the script is corresponding to the file and is directed at the file, which avoids a system or applications in a terminal unable to work properly after the finding and killing due to an erroneous operation for finding and killing the malicious programs. Therefore, adopting the technical scheme of the invention solves the problem of malicious program proliferation caused by the time-consuming version updating process of a terminal finding and killing engine, and solves the problem of a system or applications in a terminal unable to work properly after the finding and killing due to an erroneous operation for finding and killing malicious programs. In addition, the beneficial effects of timely finding and killing the malicious programs to reduce the scope of malicious program proliferation and avoiding an erroneous operation for finding and killing the malicious programs and thus ensuring a system or applications in a terminal work properly after the finding and killing are achieved.

In addition, adopting the way of downloading a script from the server for finding and killing malicious programs in a file is beneficial to dealing with unknown white utilization. A malicious program being disguised as a normal file to escape from finding and killing is called white utilization. That is because the script is strongly directed at the file and can perform precise finding and killing operation for the file. Thus the file at a grey zone can be precisely judged, and then the malicious programs adopting white utilization can be found and killed.

In another embodiment of the invention, in addition to finding and killing malicious programs in the file scanned via the script file, general rules can also be used for finding and killing malicious programs in the file scanned.

The scanning unit 120 is further configured to download general rules for finding and killing malicious programs in the file scanned from the server 200 via the communication unit 120; matching the file scanned with the general rules, and determining the finding and killing operations in the general rules corresponding to the file scanned.

For example, after being authenticated by the server 200, the scanning unit 120 downloads the general rules from the server 200. The general rules comprises: matching features and corresponding finding and killing operations; the matching features comprise: feature of information in the file and operating feature executed by the file. For example, the operating feature can be an operation such as hooking or releasing malicious codes.

For example, the device 100 is connected with the server 200. After the device 100 is authenticated by the server 200, scanning unit 120 sends a downloading request to the server 200 via the communication unit 110, to inquire in the server 200 and download the general rules. The server 200 inquires the requested general rules according to the downloading request, and sends the inquired general rules to the device 100. The general rules comprise a universal matching rule directed at all PE files (portable execute files). If the matching rules define a certain matched feature, then the corresponding finding and killing operation is adopted. The matching rules support behavioral characteristics description, such as loading DLL and hooking, and support static feature description, such as filename or file postfix, version information, signature information, etc.

The finding and killing unit 130 is specifically configured to, find and kill malicious programs in the file scanned according to the determined finding and killing operations in the general rules corresponding to the file scanned, when the scanning unit 120 does not receive the script corresponding to the file scanned from the server 200.

An example is taken to illuminate using the general rules to find and kill malicious programs in the file below.

A svchost process is scanned. Wherein the process file is svchost.dll and the process name is Trojan.W32. Agent, Svchost.exe is a system program belonging to Windows operating system, for executing a DLL file. The program is related to normal operation of the system. At the same time, svchost.exe also might be a W32.Welchia.Worm virus, which takes advantage of a WindowsLSASS loophole to make buffer overflow, leading to close down a terminal. The general rules trigger detection the loaded DLL file of Svchost.exe, judging whether the signature information of DLL is legal or not, and whether Shellcode injection exists or not. The Shellcode is a segment of codes (or padding data), for sending codes using specific loophole to the server, and generally it can obtain permission. Besides, Shellcode can be sent to an attacked service as data. When the judging result is yes, that is, the general rules are matched, corresponding finding and killing operations can be applied to find and kill malicious programs in the file.

In the embodiment, when the corresponding script is not found, the general rules are used for finding and killing malicious programs in the file. Wherein the general rules have universality and the script has better pertinence towards the file, thus the script has higher priority than the general rules. When the script corresponding to the file is obtained, the script is directly executed to find and kill malicious programs in the file; when the script corresponding to the file is not obtained, the general rules are used for finding and killing malicious programs in the file.

In the embodiment, the general rules make a judgement in accordance with various means such as static features, behavioral characteristics, and the like, thus can find and kill unknown malicious programs and throttle the unknown malicious programs at the beginning of spreading.

Figure 2:
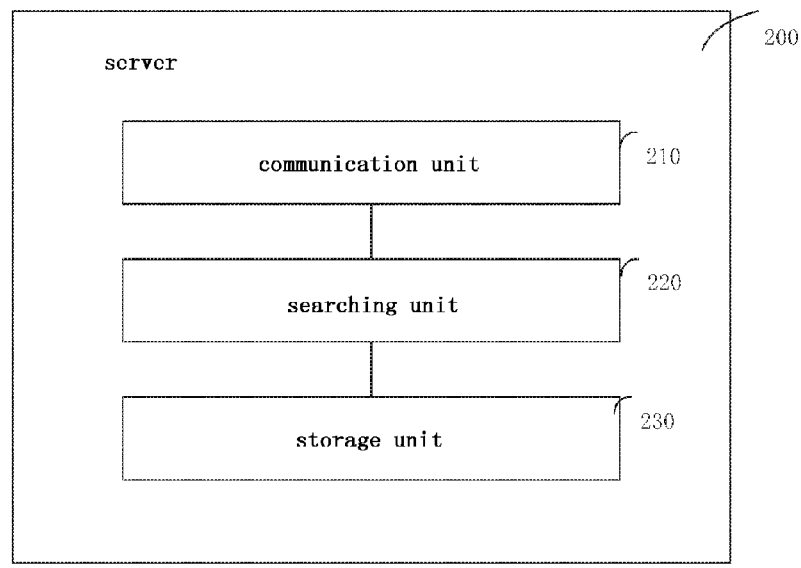
FIG. 2 is a structure diagram of a malicious program finding and killing server based on cloud security according to an embodiment of the invention.

FIG. 2 is a structure diagram of a malicious program finding and killing server based on cloud security according to an embodiment of the invention. The server 200 comprises: a storage unit 210, a communication unit 220, and a searching unit 230.

The storage unit 210 is configured to store scripts for finding and killing malicious programs in a file.

The communication unit 220 is configured to receive an index tag sent by the device 100.

The searching unit 230 is configured to search a corresponding script in the storage unit 210 according to the received index tag.

The communication unit 220 is further configured to return the script that is found to the device 100.

In the embodiment, the server 200 can issue the script to the device 100, so that the device 100 can execute the script to find and kill the malicious programs timely, without need to wait for the finding and killing engine of the terminal to update the version to find and kill the newly emerging malicious program; furthermore, the script is found according to the index tag of the file, and the script is corresponding to the file and is directed at the file, which avoids a system or applications in a terminal unable to work properly after the finding and killing due to an erroneous operation for finding and killing the malicious programs.

In another embodiment, the storage unit 210 is further configured to store the general rules. The communication unit 220 is further configured to receive a downloading request sent by the device 100. The searching unit 230 is further configured to search the general rules according to the downloading request. The communication unit 220 is further configured to return the general rules that are found to the device 100.

In the embodiment, the server can issue the general rules to the device. And the general rules make a judgement in accordance with various means such as static feature, behavioral characteristics, and the like, thus can find and kill unknown malicious programs and throttle the unknown malicious programs at the beginning of spreading.

Figure 3:
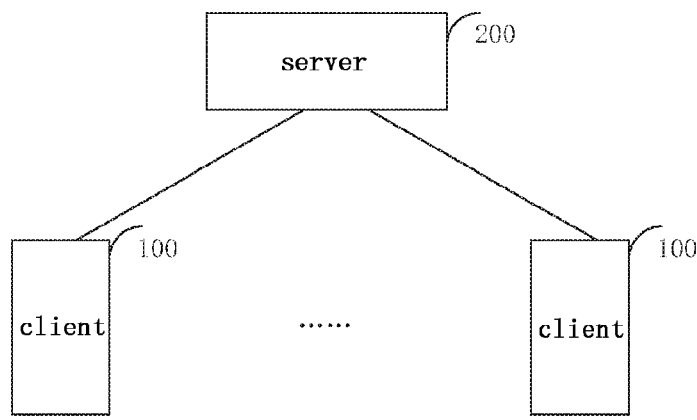
FIG. 3 is a structure diagram of a malicious program finding and killing system based on cloud security according to an embodiment of the invention.

FIG. 3 is a structure diagram of a malicious program finding and killing system based on cloud security according to an embodiment of the invention. The system comprises aforesaid server 200 and a plurality of devices 100. In the embodiment, the server 200 can be connected with the devices 100 directly or via network, no particular restriction here.

Figure 4:
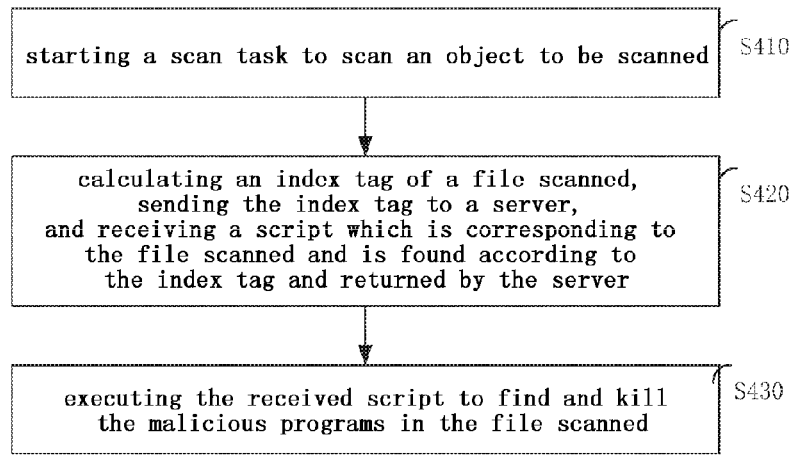
FIG. 4 is a flowchart showing a malicious program finding and killing method based on cloud security according to an embodiment of the invention.

FIG. 4 is a flowchart showing a malicious program finding and killing method based on cloud security according to an embodiment of the invention. The method comprises the following steps:

Step S410, starting a scan task to scan an object to be scanned.

For example, starting the scan task can be triggered by means of timing or user operation, etc.

The scanned object can be a memory, a boot sector, BIOS (basic input/output system), etc.

For scanning the memory, process space and process modules are enumerated to match the signatures of the memory, and calculate certain memory segments and digests of the memory modules; for scanning the boot sector, an API provided by a file system can be used for reading specific blocks and boot codes, matching the signatures and calculating digests of the specific blocks; for scanning BIOS, a relevant API provided by the system can be employed to read specific blocks and code segments, match the signatures and calculate digests of the specific blocks. The local engine can judges infected files through information obtained from the scanning.

The invention also can judge whether the file scanned is infected or not via a server, and the specifics are as follows:

Step S420, calculating an index tag of a file scanned, sending the index tag to a server, and receiving a script which is corresponding to the file scanned and is found according to the index tag and returned by the server.

For example, in Step S420 encryption value of full text and/or signature of the file scanned are calculated, and said encryption value is taken as the index tag. For example, MD5 (message digest algorithm version 5) of full text and/or signature of the file or SHA1 (hash value) of full text and/or signature of the file is calculated while the object to be scanned is scanning. The MD5 or SHA1 is the index tag. Specifically, whether to calculate MD5 or SHA1 of full text or signature or to calculate MD5 or SHA1 of both full text and signature can be determined by configuration. The configuration can be configuration in a configuration file issued by the server, wherein comprising conditions of file type, registry position and the like for different configurations. The calculated MD5 or SHA1 of the file scanned is sent to the server. After receiving MD5 or SHA1, the server searches for the received MD5 or SHA1 in a rule list, and after finding it, sends the designated script in the list to the device. The operation executed by the script is finding and killing the malicious programs corresponding to MD5 or SHA1. Specifically, script types can be achieved in format of scripting language, XML (extensive markup language), JSON and so on.

Wherein when the encryption value of the full text is calculated, the index tag comprises signatures and digest information. Therefore, the server can detect whether the file is infected or not according to the information in the index tag, and return a script for finding and killing malicious programs in the infected file. Therefore, when the script corresponding to the file is received, the file is determined to be an infected file.

For example, the finding and killing operations in the script comprise judging whether or not the file scanned is an infected system file or an application file, and if yes, repairing the file scanned, and if not, deleting the file scanned. The specific repairing operations comprise: eliminating interceptions of function call (also referred to as removing system hooks), recovering hard disk master boot record (mbr), or clearing ShellCode. The operation of deleting the file scanned comprises deleting the entire file or deleting the part with a problem in the file, such as deleting the hook in the file.

Step S430, executing the received script to find and kill the malicious programs in the file scanned.

Specifically, in Step S430, after receiving the script, the file scanned is determined as an infected file; the received script is executed, judging whether the file scanned is a system file or an application file or not according to the path of the file scanned, and if yes, repairing the file scanned, and if not, deleting the file scanned. The type of the virus infecting the file scanned is determined, and a way of repairing the file scanned is determined according to the type of the virus infecting the file scanned. The way comprises: repairing the system file, repairing the application file, eliminating interceptions of function call, recovering hard disk master boot record, or clearing ShellCode.

Wherein after calculating the encryption value of the file scanned, the subsequent files continue to be scanned, without need to wait until the script is received and finding and killing are finished. Thus, resources can be used effectively, reducing waiting and speeding up scanning.

According to the embodiment of the invention, the script can be obtained from the server, and the script can be executed to find and kill the malicious programs timely, without need to wait for the finding and killing engine of the terminal to update the version to find and kill the newly emerging malicious program; furthermore, the script is found according to the index tag of the file, and the script is corresponding to the file and is directed at the file, which avoids a system or applications in a terminal unable to work properly after the finding and killing due to an erroneous operation for finding and killing the malicious programs. Therefore, adopting the technical scheme of the invention solves the problem of malicious program proliferation caused by the time-consuming version updating process of a terminal finding and killing engine, and solves the problem of a system or applications in a terminal unable to work properly after the finding and killing due to an erroneous operation for finding and killing malicious programs. In addition, the beneficial effects of timely finding and killing the malicious programs to reduce the scope of malicious program proliferation and avoiding an erroneous operation for finding and killing the malicious programs and thus ensuring a system or applications in a terminal work properly after the finding and killing are achieved.

In addition, adopting the way of downloading the script from the server for finding and killing malicious programs in a file is beneficial to dealing with unknown white utilization. Malicious programs disguised as normal file to escape from finding and killing is called white utilization. That is because the script is strongly directed at the file and can perform precise finding and killing operation for the file. Thus the file at a grey zone can be precisely judged, and then the malicious programs adopting white utilization can be found and killed.

In another embodiment of the invention, in addition to finding and killing malicious programs in the file scanned via script file, general rules can also be used for finding and killing malicious programs in the file scanned.

Figure 5:
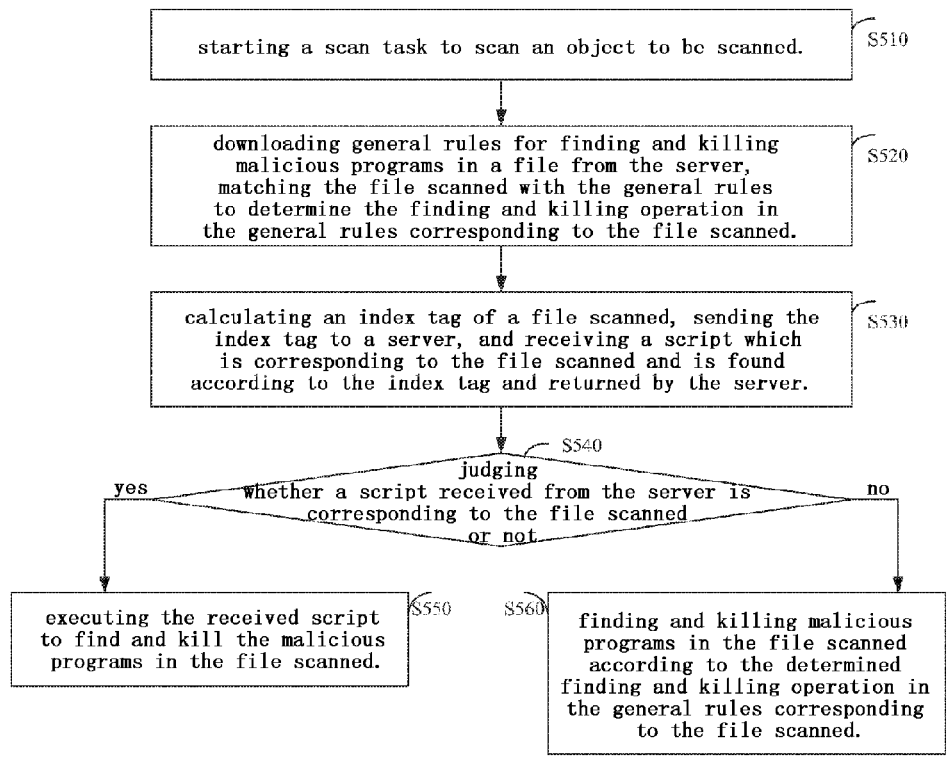
FIG. 5 is a flowchart showing a malicious program finding and killing method based on cloud security according to another embodiment of the invention.

FIG. 5 is a flowchart showing a malicious program finding and killing method based on cloud security according to another embodiment of the invention.

Step S510, starting a scan task to scan an object to be scanned.

Step S520, downloading general rules for finding and killing malicious programs in a file from the server, matching the file scanned with the general rules to determine finding and killing operations in the general rules corresponding to the file scanned.

For example, the general rules comprise: matching features and corresponding finding and killing operations. The matching features comprise: features of information in the file and operating features executed by the file.

For example, the operating features can be operations of hooking or releasing malicious codes.

In Step S520, the device is connected with the server. After the device is authenticated by the server, the device sends a downloading request to the server to inquire in the server and download the general rules. The server finds the requested general rules according to the downloading request, and sends the found general rules to the device. The general rules comprise universal matching rules directed at all PE files (portable execute file). If a definition in the matching rules matches with a feature, then the corresponding finding and killing operation is adopted. The matching rules support behavioral characteristics description, such as behaviors of loading DLL and hooks, and support static feature description, such as filename or file postfix, version information, signature information, etc.

Step S530, calculating an index tag of a file scanned, sending the index tag to a server, and receiving a script which is corresponding to the file scanned and is found according to the index tag and returned by the server.

Step S540, judging whether a script received from the server is corresponding to the file scanned or not, if yes, executing Step S550, and if not, executing Step S560.

Step S550, executing the received script to find and kill the malicious programs in the file scanned.

Step S560, finding and killing malicious programs in the file scanned according to the determined finding and killing operation in the general rules corresponding to the file scanned.

An example is taken to illuminate using the general rules to find and kill malicious programs in the file below.

A svchost process is scanned. Wherein the process file is svchost.dll and the process name is Trojan.W32.Agent, Svchost.exe is a system program belonging to Windows operating system, for executing DLL file. The program is related to normal operation of the system. At the same time, svchost.exe also might be a W32.Welchia.Worm virus, which takes advantage of a WindowsLSASS loophole to make buffer overflow, leading to close down a terminal. The general rules trigger detection the loaded DLL file of the svchost.exe, judging whether the signature information of DLL is legal or not, and whether Shellcode injection exists or not. The Shellcode is a segment of codes (or padding data), for sending codes using a specific loophole to the server, and generally it can obtain permission. Besides, Shellcode can be sent to an attacked service as data. When the judging result is yes, that is, when the general rules is matched, corresponding finding and killing operations can be applied to finding and killing malicious programs in the file.

In the embodiment, when corresponding script is not found, the general rules are used for finding and killing malicious programs in the file. Wherein the general rules have universality and the script has better pertinence to the file, thus the script has higher priority than the general rules. When the script corresponding to the file is obtained, the script is directly executed to find and kill malicious programs in the file; when the script corresponding to the file is not obtained, the general rules are used for finding and killing malicious programs in the file.

According to the device of the embodiment of the invention, wherein,
    the finding and killing unit is specifically configured to determine the file scanned as an infected file after receiving the script; executing the received script, and judging whether or not the file scanned is a system file or an application file according to the path of the file scanned, and if yes, repairing the file scanned, and if not, deleting the file scanned.

According to the device of the embodiment of the invention, wherein,
    the finding and killing unit is specifically configured to determine the type of the virus infecting the file scanned, and determine a way of repairing the file scanned according to the type of the virus infecting the file scanned. The way comprises: repairing the system file, repairing the application file, eliminating interceptions of function call, recovering hard disk master boot record, or clearing ShellCode.

According to the device of the embodiment of the invention, wherein, the scanning unit is specifically configured to download the general rules from the server after being authenticated by the server.

According to the device of the embodiment of the invention, wherein, the general rules comprise: matching features and corresponding finding and killing operations;

the matching features comprise: features of information in the file and operating features executed by the file.

According to the malicious program finding and killing server based on cloud security of an embodiment of the invention, the server comprises:

a storage unit configured to store scripts for finding and killing malicious programs in a file;

a communication unit configured to receive an index tag;

a searching unit configured to search for a corresponding script in the storage unit according to the received index tag;

the communication unit further configured to return the script that is found.

According to the server of the embodiment of the invention, wherein, the storage unit is further configured to store general rules;

the communication unit is further configured to receive a downloading request;

the searching unit is further configured to search for the general rules according to the downloading request;

the communication unit is further configured to return the general rules that are found.

The algorithm and display provided here have no inherent relation with any specific computer, virtual system or other devices. Various general-purpose systems can be used together with the teaching based on this. According to the description above, the structure required to construct this kind of system is obvious. Besides, the present invention is not directed at any specific programming language. It should be understood that various programming language can be used for achieving the content of the invention described here, and above description of specific language is for disclosing the optimum embodiment of the invention.

The description provided here explains plenty of details. However, it can be understood that the embodiments of the invention can be implemented without these specific details. The known methods, structure and techniques are not shown in detail in some embodiments, so as not to obscure the understanding of the description.

Similarly, it should be understood that in order to simplify the present disclosure and help to understand one or more of the various aspects of the invention, the various features of the invention are sometimes grouped into a single embodiment, drawing, or description thereof. However, the method disclosed should not be explained as reflecting the following intention: that is, the present invention sought for protection requires more features than the features clearly recorded in every claim. To be more precise, as is reflected in the following claims, the features of the aspects of the invention are less than all the features of a single embodiment disclosed before. Therefore, the claim complying with a specific embodiment is explicitly incorporated into the specific embodiment thereby, wherein every claim itself is one independent embodiment of the invention.

Those skilled in the art can understand that the modules of the device in an embodiment can be changed adaptively and installed in one or more devices different from the embodiment. The modules or units or elements in the embodiment can be combined into one module or unit or element, and furthermore, they can be separated into more sub-modules or sub-units or sub-elements. Except at least some of such features and/or processes or units are mutually exclusive, any combinations can be adopted to combine all the features disclosed by the specification (including the attached claims, abstract and drawings) and any methods or all processes of the device or unit disclosed as such. Unless there is otherwise explicit statement, each feature disclosed by the present specification (including the attached claims, abstract and drawings) can be replaced by alternative feature providing the same, equivalent or similar purpose.

In addition, a person skilled in the art can understand that although some embodiments described here comprise some features included in other embodiments instead of other features, the combination of features of different embodiments means falling into the scope of the present invention and forming different embodiments. For example, in the following claims, any one of the embodiments sought for protection can be used in an arbitrary combination mode.

The various components embodiments of the present invention can be realized by hardware, or realized by software modules running on one or more processors, or realized by combination thereof. A person skilled in the art should understand that microprocessor or digital signal processor (DSP) can be used for realizing some or all functions of some or all components of the malicious program finding and killing device, server and system based on cloud security according to the embodiments in the present invention in practice. The present invention can also be realized by programs of apparatus or device (for example, computer programs and computer program products) used for carrying out one part of or all the method described here. Such programs for realizing the present invention can be stored in computer readable medium, or can be in form of one or more signals. Such signals can be downloaded from the Internet website or be provided at signal carriers, or be provided in any other forms.

Figure 6:
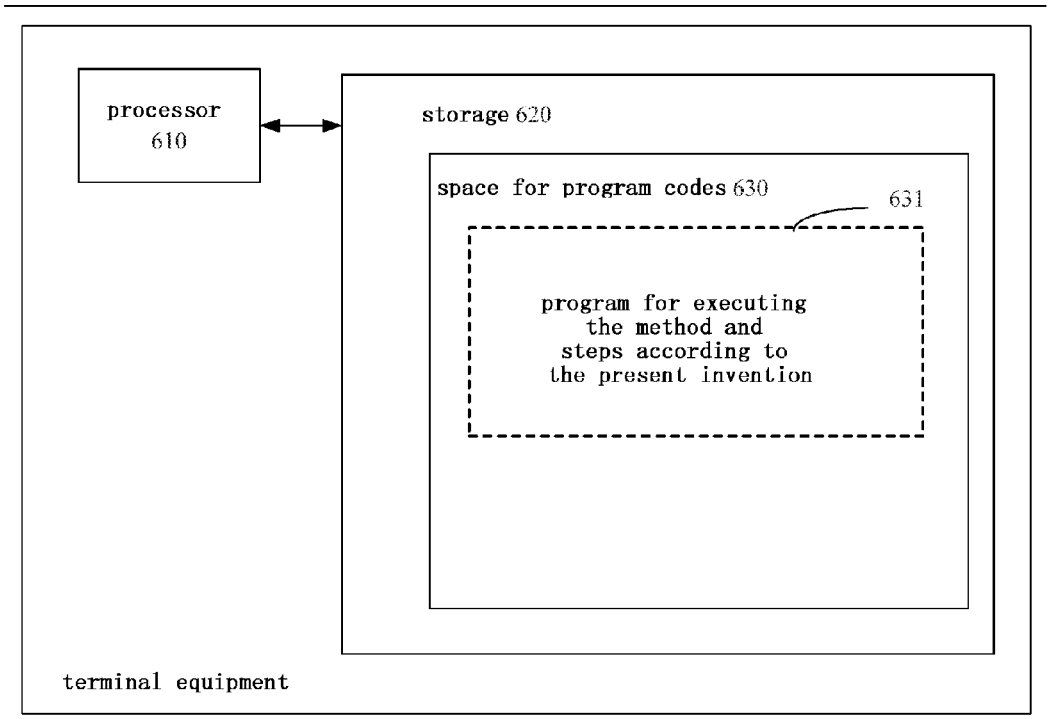
FIG. 6 schematically shows a block diagram of a terminal device for executing the method according to the invention.
Figure 7:
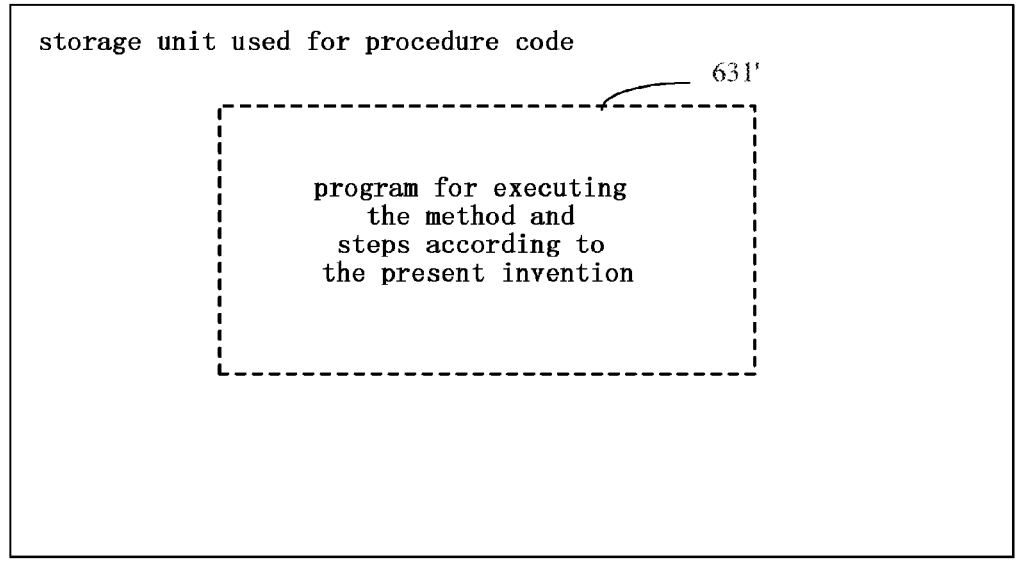
FIG. 7 schematically shows a storage unit for keeping or carrying program codes for implementing the method according to the invention.

For example, FIG. 6 is a block diagram schematically showing a terminal device for executing the method according to the invention. The terminal device comprises a processor 610 and a computer program product in the form of storage 620 or a computer readable medium. The storage 620 can be electronic storage such as flash memory, EEPROM (Electrically Erasable Programmable Read—Only Memory), EPROM, hard disk or ROM, and the like. Storage 620 possesses storage space 630 for carrying out program codes 631 of any steps of aforesaid method. For example, storage space 630 for program codes can comprise various program codes 631 respectively used for realizing any steps of aforesaid method. These program codes can be read out from one or more computer program products or written in one or more computer program products. The computer program products comprise program codes carriers such as hard disk, Compact Disc (CD), memory card or floppy disk and the like. These computer program products usually are portable or fixed storage unit as described referring to FIG. 7. The storage unit can possess memory sections, storage space like the storage 620 in the terminal device in FIG. 6. The program codes can be compressed in, for example, a proper form. Generally, storage unit comprises computer readable codes 631', i.e. the codes can be read by processors such as 610 and the like. When the codes run on a terminal device, the terminal device will carry out various steps of the method described above.

The "an embodiment", "embodiments" or "one or more embodiments" referred here mean that specific features, structures or characteristics described in combination with the embodiments are included in at least one embodiment of the present invention. In addition, please note that the phrase "in an embodiment" does not necessarily mean a same embodiment.

The description provided here explains plenty of details. However, it can be understood that the embodiments of the invention can be implemented without these specific details. The known methods, structure and techniques are not shown in detail in some embodiments, so as not to obscure the understanding of the description.

It should be noticed that the forgoing embodiments are intended to illustrate the present invention and not to limit this invention, and a person skilled in the art can design alternative embodiments without departing from the scope of the appended claims. In the claims, any reference marks between brackets should not be constructed as limit for the claims. The word "comprise" does not exclude elements or steps that are not listed in the claims. The word "a" or "one" before the elements does not exclude that more such elements exist. The present invention can be realized by means of hardware comprising several different elements and by means of properly programmed computer. In the unit claims listing several devices, several of the devices can be embodied by a same hardware item. The use of words "first, second and third" does not mean any sequence. These words can be explained as name.

In addition, it should be noticed that the language used in the invention is chosen for the purpose of readability and teaching, instead of for explaining or limiting the topic of the present invention. Therefore, it is obvious for a person skilled in the art to make a lot of modification and alteration without departing from the scope and spirit of the appended claims. For the scope of the invention, the disclosure of the invention is illustrative instead of restrictive. The scope of the present invention is defined by the appended claims.

The invention claimed is:

1. A malicious program finding and killing device based on cloud security, the device comprising one or more non-transitory computer readable mediums configured to store computer-executable instructions and at least one processor configured to execute the computer-executable instructions to perform operations comprising:
    sending information to a server;
    receiving information returned by the server;
    starting a scan task to scan an object;
    calculating an index tag of a file scanned in the object;
    sending the index tag to the server;
    receiving a script returned by the server, the script being found according to the index tag and corresponding to the file scanned;
    downloading general rules for finding and killing malicious programs in the file scanned from the server;
    matching the file scanned with the general rules;
    determining finding and killing malicious programs operations in the general rules corresponding to the file scanned;
    executing the received script to find and kill the malicious programs in the file scanned; and
    when the script corresponding to the file scanned is not received from the server, finding and killing the malicious programs in the file scanned according to the determined finding and killing malicious programs operations in the general rules corresponding to the file scanned.

2. The device according to claim 1, wherein calculating the index tag of the file scanned includes calculating an encryption value of a full text and/or a signature of the file scanned, and taking the encryption value as the index tag.

3. The device according to claim 1, wherein executing the received script to find and kill the malicious programs in the file scanned includes determining the file scanned as an infected file after receiving the script, executing the received script, judging whether or not the file scanned is an infected system file or an application file according to a path of the file scanned, and if yes, repairing the file scanned, and if not, deleting the file scanned.

4. The device according to claim 3, wherein executing the received script to find and kill the malicious programs in the file scanned includes determining the type of a virus infecting the file scanned, and determining a way of repairing the file scanned according to the type of the virus infecting the file scanned, and wherein the way of repairing the file scanned comprises repairing the system file, repairing the application file, eliminating interceptions of function call, recovering hard disk master boot record, or clearing shellcode.

5. The device according to claim 1, wherein downloading the general rules for finding and killing malicious programs in the file scanned from the server includes downloading the general rules from the server after being authenticated by the server.

6. The device according to claim 1, wherein the general rules comprises matching features and corresponding finding and killing malicious programs operations; and wherein the matching features comprise information in the file and an operating feature executed by the file.

7. A malicious program finding and killing server based on cloud security, the server comprising one or more non-transitory computer readable mediums configured to store computer-executable instructions and at least one processor configured to execute the computer-executable instructions to perform operations comprising:
    storing scripts and general rules for finding and killing malicious programs in a file, the general rules comprising matching features and corresponding finding and killing malicious programs operations, the matching features comprising information in the file and an operating feature executed by the file;
    receiving an index tag and a downloading request;
    searching a corresponding script according to the received index tag and the general rules according to the downloading request; and
    returning the script and the general rules that are found.

8. A malicious program finding and killing method based on cloud security, the method comprising:
    starting a scan task to scan an object;
    calculating an index tag of a file scanned in the object;
    sending the index tag to a server;
    receiving a script returned by the server, the script being found according to the index tag and corresponding to the file scanned;
    after starting the scan task, downloading general rules for finding and killing malicious programs in the file scanned from the server, matching the file scanned with the general rules, and finding and killing operations in the general rules corresponding to the file scanned;
    executing the received script to find and kill the malicious program in the file scanned; and
    when the script corresponding to the file scanned is not received from the server, finding and killing malicious programs in the file scanned according to finding and killing malicious programs operations in the general rules corresponding to the file scanned.

9. The method according to claim 8, wherein calculating the index tag of the file scanned specifically includes calculating an encryption value of a full text and/or a signature of the file scanned, and taking the encryption value as the index tag.

10. The method according to claim 8, wherein executing the received script to find and kill the malicious programs in the file scanned comprises after the script is received, determining the file scanned as an infected file, executing the received script, judging whether or not the file scanned is a system file or an application file according to a path of the file scanned, and if yes, repairing the file scanned, and if not, deleting the file scanned.

11. The method according to claim 10, wherein repairing the file scanned comprises determining the type of a virus infecting the file scanned, and determining a way of repairing the file scanned according to the type of the virus infecting the file scanned, and wherein the way of repairing the file scanned comprises repairing the system file, repairing the application file, eliminating interceptions of function call, recovering hard disk master boot record, or clearing shellcode.

12. The method according to claim 8, wherein downloading the general rules for finding and killing malicious programs in the file from the server comprises downloading the general rules from the server after being authenticated by the server.

13. The method according to claim 8, wherein the general rules comprises matching features and corresponding finding and killing malicious programs operations; and wherein the matching features comprise information in the file and an operating feature executed by the file.

14. The server according to claim 7, wherein the general rules are used for finding and killing malicious programs in the file scanned through matching the file scanned with the general rules and determining the finding and killing operations in the general rules corresponding to the file scanned.

15. The device according to claim 1, wherein the general rules are used for finding and killing malicious programs in the file scanned through matching the file scanned with the general rules and determining the finding and killing operations in the general rules corresponding to the file scanned.

* * * * *